Aug. 9, 1966   G. T. McCOPPIN   3,265,477
APPARATUS FOR FORMING AND COLLECTING MINERAL FIBERS
Filed May 20, 1963   6 Sheets-Sheet 1
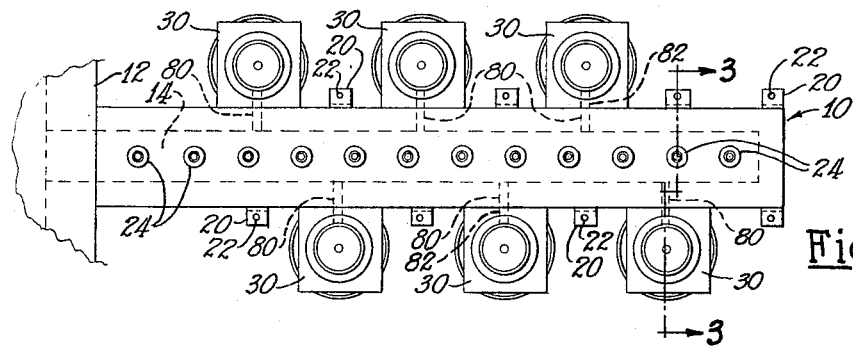
Fig. 2
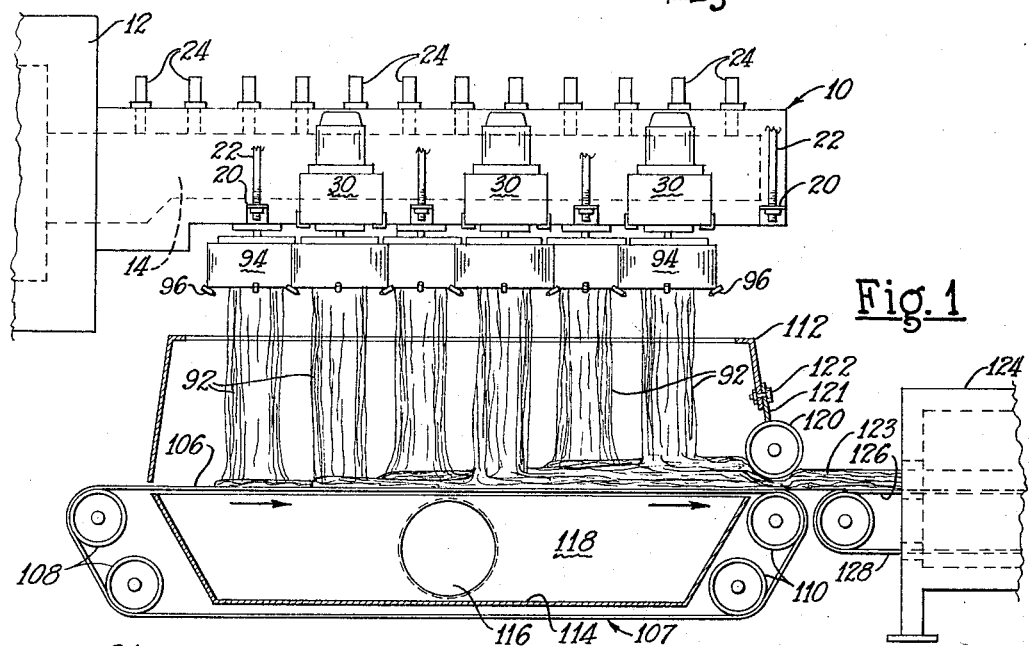
Fig. 1
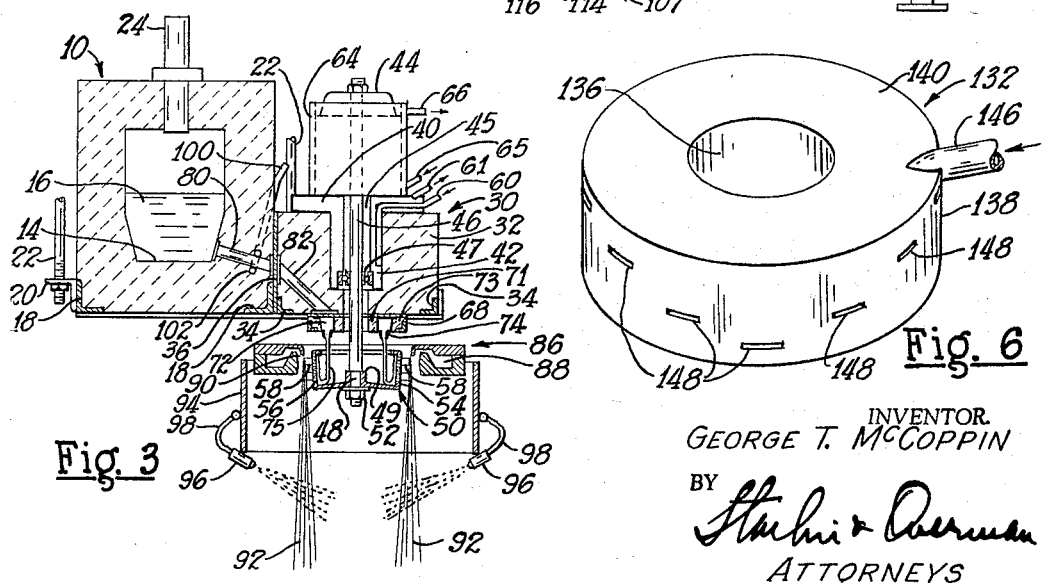
Fig. 3
Fig. 6
INVENTOR.
GEORGE T. McCOPPIN
BY
*Stuckie & Overman*
ATTORNEYS Aug. 9, 1966   G. T. McCOPPIN   3,265,477
APPARATUS FOR FORMING AND COLLECTING MINERAL FIBERS
Filed May 20, 1963   6 Sheets-Sheet 2

INVENTOR.
GEORGE T. McCOPPIN
BY
ATTORNEYS

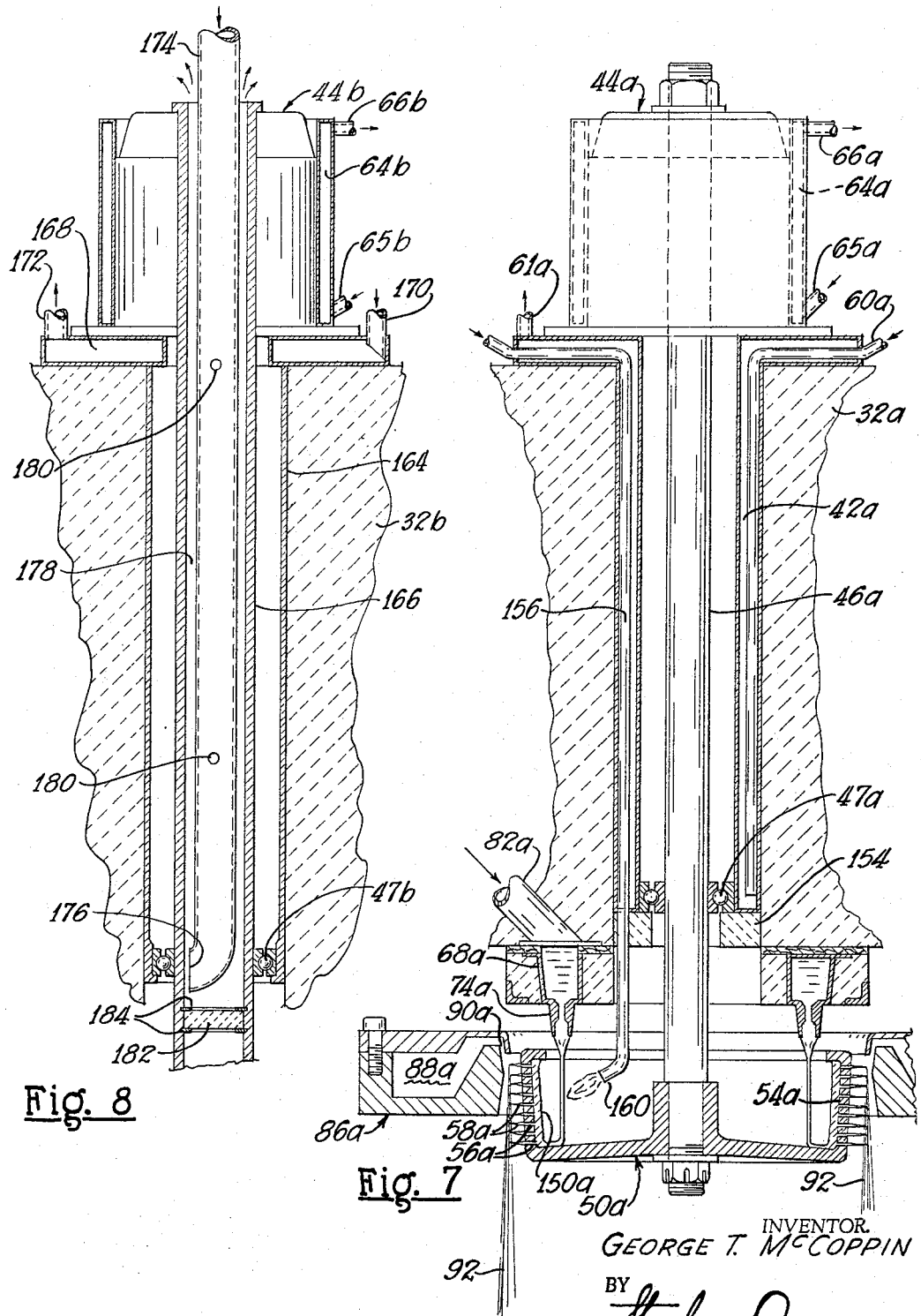

INVENTOR.
GEORGE T. McCOPPIN
BY
ATTORNEYS

INVENTOR.
GEORGE T. McCOPPIN
BY
ATTORNEYS

INVENTOR.
GEORGE T. McCOPPIN
BY
ATTORNEYS

United States Patent Office 3,265,477
Patented August 9, 1966

1

3,265,477
APPARATUS FOR FORMING AND
COLLECTING MINERAL FIBERS
George T. McCoppin, Newark, Ohio, assignor to Owens-Corning Fiberglas Corporation, a corporation of Delaware
Filed May 20, 1963, Ser. No. 281,543
6 Claims. (Cl. 65—1)

This invention relates to method of and apparatus for forming heat-softenable mineral materials into discrete bodies or fibers, and more particularly to a method and arrangement employing several fiber forming units supplied with mineral material from a single supply and wherein each unit utilizes centrifugal forces to form the heat-softened material into linear bodies or primary filaments and the primary filaments attenuated to fine fibers through the medium of a high velocity attenuating blast.

Mineral fibers, and more especially glass fibers, have been heretofore produced commercially utilizing centrifugal forces of a rotating rotor or spinner to deliver primary filaments or linear bodies of the glass in heat-softened condition into an annularly-shaped gaseous blast whereby the blast attenuates the linear bodies or primary filaments to fibers.

In the methods and apparatus heretofore used for such purpose, the rotary fiberizing units and the driving means therefor have been disposed beneath a horizontally arranged forehearth of a glass melting or glass conditioning furnace and a stream of glass from the forehearth or supply is delivered vertically through a comparatively long hollow shaft of each unit into a motor-driven rotor or spinner disposed at a substantial distance from the forehearth or supply. The molten glass of the stream moving through a substantial vertical distance from the supply results in the substantial heat loss from the glass necessitating the employment of heating means adjacent or near the rotor, or the glass in the rotor, in order to maintain the glass in a condition to be effectively acted upon by centrifugal forces. In such installations, the motor is usually disposed directly beneath the forehearth and is subjected to the heat from the forehearth and is additionally subjected to the heat from the glass stream moving through a hollow shaft or quill supporting the rotor. In such arrangement, the stream of glass is usually delivered into the central region of the rotor and, in order to provided for adequate distribution of the softened glass at the periphery of the rotor, a perforated distributing cup is used for the purpose. An arrangement of this general character is shown in Patent No. 3,077,751.

The present invention embraces a method of forming fibers from heat-softened mineral material wherein the centrifuging of the softened material is carried on at a region close to the forehearth or supply of the material whereby heat losses from the material are reduced to a minimum.

Another object of the invention is the provision of a method of arranging motor operated centrifuging units of fiber-forming apparatus close to the supply of softened mineral material but wherein the motor driving means for the units are disposed so as to function in a reduced temperature thereby reducing maintenance and prolonging the life of the units Another object of the invention is the provision of an apparatus for forming fibers from heat-softened mineral material utilizing centrifugal forces wherein a rotor or spinner distributing the material into an attenuating blast is disposed close to the heated supply of material whereby improved distribution of the glass in the rotor is obtained.

Another object of the invention is the provision of an arrangement including a plurality of rotary fiber-forming units wherein the distance from the forehearth or

2 supply of softened material to the rotor of each unit is reduced to a minimum and the heat losses greatly reduced whereby fibers are produced more economically.

Another object of the invention resides in means for directing and delivering glass into a rotating rotor in a manner whereby the glass is distributed at the periphery of the rotor to secure the most efficient centrifugal projection of primary filaments or bodies from orifices in the rotor into an annular attenuating blast to produce attenuated fibers of more uniform size.

Another object of the invention resides in an arrangement for supplying heat in a rotor in a manner to aid in the distribution of glass at the periphery of the rotor.

Another object of the invention resides in a novel orientation of centrifugal fiber-forming units relative to a forehearth of a melting furnace whereby the fibers from the units may be collected in a comparatively wide mat or collected in a manner to concomitantly form two or more mats in juxtaposed relation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of an arrangement, certain portions being shown in section, embodying a form of novel apparatus for carrying out the method of the invention;

FIGURE 2 is a top plan view of the forehearth and fiber-forming units illustrated in FIGURE 1;

FIGURE 3 is a transverse sectional view taken substantially on the line 3—3 of FIGURE 2;

FIGURE 6 is an isometric view of a burner means shown in FIGURE 5 for applying heat in the rotor;

FIGURE 7 is an enlarged vertical sectional view illustrating the mounting and driving means for the rotor and a modified form of means for applying heat adjacent the rotor;

FIGURE 8 is a sectional view illustrating a method of reducing the temperature of the rotor mounting and driving means;

Figure 4:
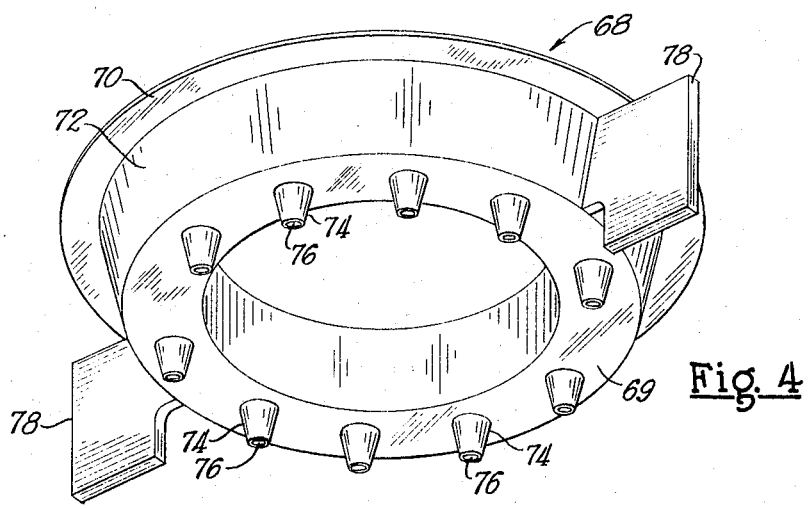
FIGURE 4 is an isometric view illustrating a form of feeder or bushing for delivering streams of heat-softened material into a hollow rotor.

While the method and apparatus of the invention are particularly usable for forming fibers from heat-softenable material such as glass wherein primary filaments of the glass projected from a rotating spinner or rotor are attenuated to fibers by a high velocity gaseous blast, it is to be understood that the method and apparatus may be employed for forming fibers from other heat-softenable materials or may be used wherever the same may be found to have utility.

Referring initially to FIGURES 1 through 4 of the drawings, the arrangement of the invention is utilized with an elongated forehearth 10 connected with a furnace 12 in which mineral material, such as glass, is reduced to molten or flowable state and refined therein. The forehearth is provided lengthwise with a channel 14 arranged to receive flowable refined glass 16 from the melting furnace 12, the glass flowing lengthwise of the channel 14 providing a supply for the fiber-forming units.

The forehearth or member 10 is fashioned of high temperature resistant refractory and is mounted upon angle members or bars 18 (shown in FIGURE 3) extending lengthwise of the forehearth and equipped with outwardly extending brackets 20 having openings to receive the lower ends of rods or suspension members 22 supporting the forehearth from a conventional superstructure (not shown).

A plurality of conventional gas-fired radiant type burners 24 are arranged in the roof of the forehearth to maintain the glass in the forehearth channel in flowable condition, the burners being provided with independent controls to maintain proper temperatures throughout the length of the channel.

The arrangement of the present invention is inclusive of one or more fiber-forming units 30 of the rotary type offset from the central axis of the forehearth or flow channel 14 in the form shown in FIGURES 1 through 4. The fiber-forming units 30, are disposed laterally at each side of the forehearth in alternate or echelon relation. Each unit is inclusive of a member or block 32 of refractory supported in contiguous relation with the adjacent wall of the forehearth 10 in the manner shown in FIGURE 3.

The block or member 32 may be supported by structural members or brackets 34 also suspended from the superstructure. Disposed between the contiguous regions of the member or block 32 and the forehearth 10 is a sealing means 36 of suitable high temperature resistant sealing material. The fiber-forming units 30, illustrated in FIGURES 1 through 4, are of identical construction. The member or block 32 of each unit is fashioned with a vertical opening accommodating a fitting 40 providing a hollow cooling jacket portion 42 as shown in FIGURE 3.

Supported upon the upper portion of the fitting 40 is an electrically energizable motor 44 provided with a shaft 46 which extends downwardly through a tubular space 45 provided by the inner wall of the cooling jacket and through an opening in the member 32 beneath the jacket. The shaft 46 is formed with a tenon 48 on which is assembled the hub portion 49 of a rotor or spinner 50, the spinner being secured on the shaft by a nut 52. The motor shaft is journaled in suitable anti-friction guide bearings 47.

The rotor 50 is of hollow construction and provided with a comparatively thin peripheral wall 54 formed with a large number of openings or orifices 56 through which heat-softened glass within the rotor is projected outwardly by centrifugal forces in the form of elongated discrete bodies or primary filaments 58. The cooling jacket 42 accommodates circulating coolant, such as water, admitted through an inlet tube 60 and conveyed away through an outlet tube 61. The motor 44 may also be surrounded with a cooling jacket 64 accommodating circulating cooling fluid admitted through an inlet pipe 65 and conveyed away by an outlet pipe 66.

Secured to the lower surface of the member or block 32 is a stream feeder or bushing 68, of a character particularly illustrated in FIGURE 4, of generally circular configuration having a circular cover 70 secured to the block or member 32 by suitable high temperature resistant sealing means. The feeder or bushing 68 is preferably fashioned of an alloy of platinum and rhodium and is encased or surrounded by annularly shaped members 71 and 73 of refractory.

As shown in FIGURE 3, the bushing 68 is fashioned with an annular channel or passage 72 adapted to receive heat-softened glass from the forehearth 10.

As shown particularly in FIGURE 4, the floor 69 of the annular channel or passage 72 in the feeder is provided with a plurality of circumferentially-arranged depending projections or tips 74, each being fashioned with an orifice or outlet 76 through which a stream 75 of glass from the annular passage flows into the interior of the rotor 50, as shown in FIGURE 3. The feeder or bushing 68 is provided with diametrically arranged terminal lugs 78 arranged to be connected with a source of electric current of comparatively high amperage and low voltage for heating the bushing or feeder to maintain the glass therein at a desired temperature.

A salient feature of the invention is the positioning of the feeder 68 and the rotor 50 as close as practicable to the supply of glass 16 in the forehearth channel in order to reduce heat losses to a minimum. Arranged laterally with respect to the channel 14 in the forehearth is a tube 80 preferably formed of platinum and rhodium alloy, the inlet of which opens into the forehearth channel 14, the outlet registering with a second tube 82 fashioned of alloy of platinum and rhodium disposed in a passage in the block 32, the outlet of the tube 82 being in registration with an opening in the cover 70 for the annular passage 72 in the feeder 68.

From examination of FIGURE 3, it will be seen that the glass 16 in the forehearth channel 14 flows laterally through the passage provided by the tubes 80 and 82 into the annular channel 72 in the feeder 68 thence through the orifices 76 in the projections 74 into the interior of the rotor 50. The rotor 50 is disposed as close as practicable to the feeder or bushing 68. As the tubes 80 and 82 are surrounded by refractory of the forehearth 10 and the block 32, there is very little heat loss so that the glass in the channel 72 is substantially at the same temperature as the glass in the forehearth channel 14.

Hence the heat loss is reduced to the comparatively small amount of heat dissipated from the streams entering the rotor. As the rotor or spinner is close to the feeder, the heat loss is held to a minimum. Surrounding the rotor 50 is a blower construction 86 provided with an annular manifold or chamber 88 in communication with an annular blower slot 90. The manifold 88 is in communication with a supply of fluid under pressure as, for example, steam or compressed air which is delivered through the annular blower slot 90 at high velocity.

The blast of steam or other gas, being directed downwardly, engages the primary filaments or bodies 58 of softened glass projected from the rotating rotor by centrifugal forces and attenuates the glass to fine fibers 92 which move downwardly from each blower in the form of a hollow beam-like pattern or configuration.

A circular member or guard 94 preferably surrounds the blower 86 and extends downwardly a substantial distance therefrom. The fibers 92 may be treated with binder or coating material delivered under pressure from suitable nozzles 96 connected with tubes 98 which are in communication with a supply of binder or coating material.

As shown in FIGURE 3, a tube 100 is provided for each glass conveying tube 80 and is formed with a convolution or partial convolution 102 surrounding the tube 80. When it is desired to interrupt the glass flow to a unit 30, water or other cooling fluid may be introduced into the tube 100 which, flowing through the convolution 102, causes the glass to congeal or freeze in the tube 80 at the region of the convolution.

A restart of the unit may be accomplished by withdrawing the temperature reducing fluid from the tube 100, the heat from the adjacent flowable glass being effective to heat the congealed region to a flowable condition and re-establish flow to the feeder 68. Each of the units 30, shown in FIGURES 1 and 2, receives heat-softened glass through a transversely arranged channel provided by the sets of connecting tubes 80 and 82.

An arrangement for collecting the attenuated fibers 92 in a mass formation is illustrated in FIGURE 1. Disposed beneath the plurality of fiber-forming units 30 is an upper flight 106 of an endless belt conveyor 107 which is supported upon pairs of rolls 108 and 110, one of the rolls being driven at a comparatively low speed by suitable motive means in a conventional manner.

A forming hood or enclosure 112 of substantially rectangular configuration is disposed above the conveyor flight 106 and serves to confine the blast-attenuated fibers for movement toward the conveyor flight 106 on which the fibers 92 of the beams of fibers are collected from the several units.

The conveyor 107 is of the reticulated or foraminous type to facilitate the passage of air and gases through the conveyor flight. Disposed beneath the the conveyor flight 106 is a receptacle 114 connected by means of a tube 116 with a suction blower or other means (not shown) for establishing subatmospheric pressure in the chamber 118 provided by the receptacle 114. The establishment of subatmospheric pressure in the chamber 118 conveys away the gases of the attenuating blasts from the blowers 86 and blast-induced air and assists in directing the fibers onto the conveyor flight 106.

The upper flight 106 of the conveyor moves in a right-hand direction. Disposed at the exit region of the forming hood or enclosure 112 is a journally-supported roll 120 carried by a member 121, the latter being adjustably supported by a bolt and slot arrangement 122, the thickness of the fibrous mat 123 being determined by the position of adjustment of the sizing roll 120. The sizing roll 120 partially compresses the mass of fibers to the desired thickness in forming the mat 123.

The binder applied to the fibers from the nozzles 96 may be of a heat curable character such as phenolformaldehyde. Where it is desired to cure the binder in the mat, an oven 124 is heated by conventional means and the mat 123 conveyed through the oven upon an upper flight 126 of a second endless belt conveyor 128. The quantity of fibers in the mat may be varied by regulating the speed of advancement of the conveyor 107.

Figure 5:
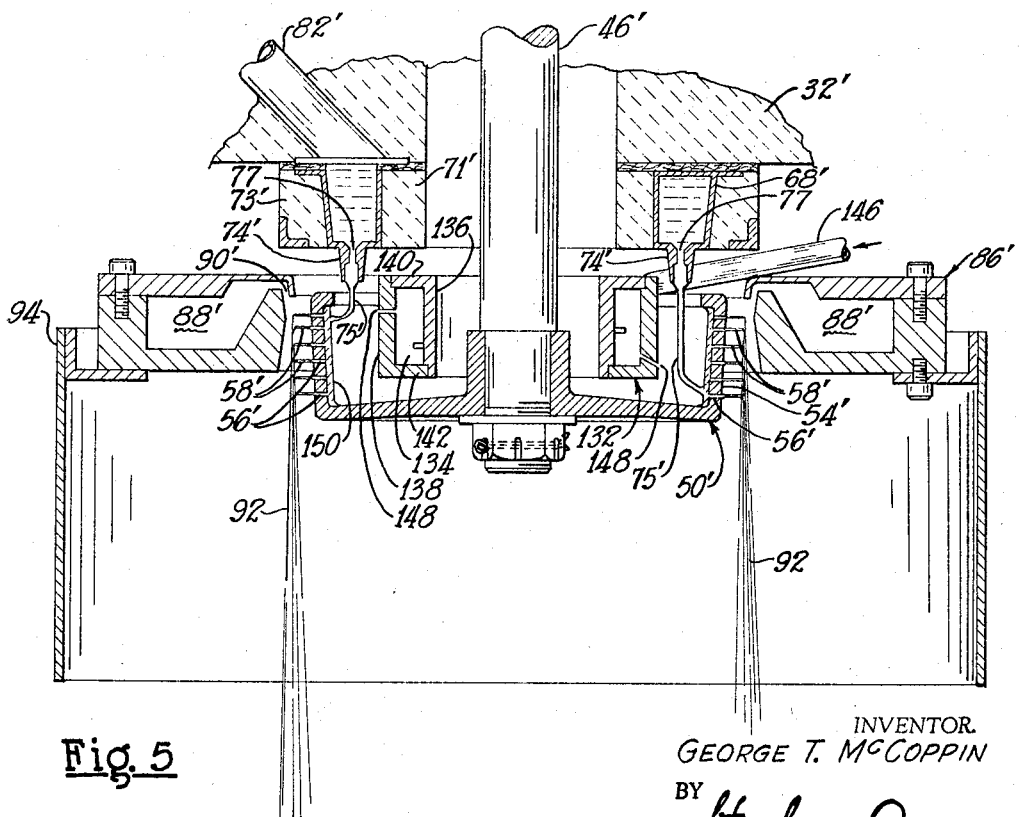
FIGURE 5 is an enlarged fragmentary sectional view illustrating the arrangement of FIGURE 3 in combination with means fo applying heat interiorly of the rotor.

FIGURE 5 illustrates the rotor, the blast establishing blower and feeder or bushing arrangement shown in FIGURE 3 in conjunction with means for applying heat interiorly of the rotor. The heat applying arrangement involves the delivery of an ignitable mixture or the delivery of burned gases or products of combustion into the rotor in a manner to assist in the distribution of the glass of the streams on the orificed wall 54' of the rotor on spinner. The member or block 32' supports the annular feeder 68', the latter being encased in annular members 71' and 73' of refractory to minimize heat losses.

The feeder 68' receives heat-softened glass from the forehearth channel through the passage or tube 82'. The rotor 50' is mounted on the lower end of the motor-driven shaft 46', the rotor being fashioned with a large number of orifices 56' through which primary filaments 58' of glass are projected by centrifugal forces set up by rotation of the rotor or spinner. Streams of glass from the feeder 68' flow through the orificed tips 74' into the rotor.

The rotor is surrounded by a blower means 86' having an annular manifold or chamber 88' through which steam or air under pressure is delivered through an annular restricted orifice 90', the high velocity blast from the orifice engaging the primary filaments 58' to attenuate them to fine fibers 92.

If desired, the chamber 88' may be supplied with combustible mixture and the mixture burned within the chamber under confined conditions and the intensely hot burned gases or products of combustion delivered through the annular orifice 90' at comparatively high velocities for attenuating the primary filaments to fibers. Disposed within the rotor 50' is a burner 132 having an annularly-shaped chamber 134 defined by two annularly-shaped concentrically arranged lateral walls 136 and 138 and upper and lower walls 140 and 142, as shown in FIGURES 5 and 6.

Secured to a wall region of the chamber 134 is a radially extending tube 146 which provides a support to maintain the burner 132 in a relatively fixed position within the rotor. The outer wall 138 of the burner 132 is fashioned with a plurality of slots 148 arranged in echelon relation or spaced at different levels as particularly shown in FIGURE 6. In this arrangement, a slot 148 is disposed adjacent each stream 75' of glass.

Thus, with a feeder of the character shown in FIGURE 4 having ten orificed projections for flowing ten streams of glass, the wall 138 of the burner 132 is fashioned with ten slots or orifices 148 with an orifice adjacent each glass stream, the slots being at varying levels depending upon the vertical position of a particular orifice in the burner wall 138. As shown in FIGURE 6, each orifice 148 is preferably elongated in a circumferential direction to form a generally rectangular slot.

The burner 132 may be utilized to produce heat within the rotor by two different methods. A supply of fuel gas and air or fuel gas alone may be continuously supplied through the tube 146 to the chamber 134 and the mixture or the fuel gas projected through the slot-like orifices 148 under comparatively low pressure and the mixture or fuel gas ignited exteriorly of the slots or orifices 148 whereby the flames of the burning gases are projected against the glass streams 75' with sufficient velocity to deflect or bias the glass streams toward the region of the interior peripheral surface of the rotor adjacent the rotor orifices 56'.

Thus, in FIGURE 5, the extreme left-hand stream 75' is deflected by burning gases from the orifice 148 toward the upper region of the rotor, while the stream at the extreme right-hand region of the rotor is deflected by burning gases from the lower orifice 148 toward the lower interior region of the peripheral wall of the rotor. The other glass streams adjacent the respective slot-like orifices 148 are directed by the velocity of the gases toward intermediate regions vertically of the peripheral wall of the rotor.

By arranging the slots 148 at different levels, the glass of the individual streams 75' may be diverted in desired directions to secure the most effective distribution of the glass and provide substantially uniform film 150 of glass throughout the interior peripheral wall of the rotor so that the primary filaments 58' are of substantially uniform size and the fibers attenuated therefrom of more uniform size.

The burner 132 may be utilized as an internal combustion burner to burn a combustible mixture of fuel gas or air or other oxidant within the annular chamber 134. By burning the mixture within the chamber under confined conditions, the burning gases undergo expansion in the chamber and are projected through the slot-like orifices 148 at substantial velocities and at high temperatures so that the glass is maintained at the proper attenuating temperature within the rotor and the velocity of the burning gases additionally utilized to deflect or bias the streams 75' of glass toward the peripheral wall of the rotor.

Through the arrangement, shown in FIGURE 5, establishing heat within the rotor, no heat loss is encountered and the glass of the film 150 may be at substantially the same temperature as the glass in the forehearth channel and in the feeder 68'. It will be noted that the orificed projections 74' are provided with restricted passageways 77 for metering the glass and further control over the distribution of the glass may be exercised by varying the sizes of the restricted passageways in the individual tips.

FIGURE 7 illustrates another method of applying heat interiorly of the rotor. The rotor and motor driving arrangement therefor is the same as that shown in FIGURE 3 wherein the rotor 50a is secured to the lower end of the shaft 46a driven by the motor 44a. The shaft 46a is journaled in anti-friction bearings 47a and a cooling jacket 42a disposed in a passage in the block of refractory 32a surrounds the shaft, the cooling jacket being provided with an inlet tube 60a and an outlet tube 61a for conveying cooling fluid into and away from the jacket. The motor 44a is provided with a cooling jacket 64a having inlet and outlet pipes 65a and 66a to accommodate a cooling fluid.

An annular member or ring 154 is disposed beneath the cooling jacket 42a and the shaft bearing 47a. Extending through the cooling jacket and through an opening in the member 154 is a tubular member or pipe 156 adapted to be connected with a supply of fuel gas and air, the lower portion of the tube terminating in a nozzle 160. The combustible mixture is delivered through the pipe 156 and extruded from the nozzle 160 under comparatively low pressure and the mixture ignited at the nozzle 160.

The pipe 156 and nozzle 160 are stationary and, during rotation of the rotor 50a, the flames or burning gases provide heat to maintain the film of glass 150a at the peripheral wall 54a in a flowable condition to be projected by centrifugal forces through the orifices 56a to form primary filaments 58a.

The molten glass from the forehearth, of the character shown in FIGURES 1 through 3, flows through the tube 82a into the annularly-shaped feeder or bushing 68a and streams of glass flowed into the rotor through the plurality of orificed projections 74a.

Surrounding the rotor 50a is a blower 86a provided with an annular manifold or chamber 88a and steam or compressed air under pressure is delivered therefrom through the annular restricted slot or orifice 90a, the high velocity gases engaging the primary filaments 58a and attenuating them to fine fibers 92. The heat loss from the streams occurring between the orificed projections 74a and the rotor wall is small and such heat loss is substantially replaced by heat from the burning gases at the region of the nozzle 160.

FIGURE 8 illustrates another method of maintaining cooling the rotor supporting shaft. In this form, the member or block 32b is formed with a vertical passageway into which extends a metal liner or sleeve 164 supporting an anti-friction bearing 47b for the shaft 166. In the form shown in FIGURE 8, the motor shaft 166 is hollow or tubular and supports a rotor (not shown) at the lower end thereof. A pancake-type cooling jacket 168 having an inlet 170 and an outlet 172 accommodates circulating cooling fluid and is disposed on the upper surface of the block 32b and provides a support for the motor 44b.

The motor is preferably surrounded by a cooling jacket 64b provided with a fluid inlet 65b and outlet 66b for conveying cooling water or other coolant into and away from the jacket 64b. In this form, the hollow shaft 166 supporting the rotor driven by the motor 44b extends through the motor. Extending downwardly into the hollow motor shaft 166 is a relatively stationary tube or pipe 174 of lesser diameter than the liner 164 providing an annular space 178. The lower end region of the tube 174 terminates in an elbow shaped outlet 176.

The pipe 174 is adapted to be connected with a supply of compressed air or other fluid having good heat absorption characteristics which is delivered through the elbow outlet 176 and flows upwardly through the annular space 178 to the atmosphere. The wall of tube 174 may be provided with small openings 180 for delivery of air into regions along the tube 174 in addition to the delivery of air through the elbow outlet 176. Disposed beneath the elbow outlet 176 within the hollow shaft 166 is an abutment member or plug 182 of high temperature resistant refractory held in place by snap rings 184.

The abutment or plug 182 prevents the cooling air delivered from the outlet 176 from affecting the temperature of the rotor secured to the shaft below the abutment 182. A rotor of the character hereinbefore described is supported by the hollow motor shaft 166 and the glass delivered into the rotor from a feeder of a character shown in FIGURE 4.

The heating arrangements, shown in FIGURES 5 and 7, may be incorporated in a rotor structure used with the tubular shaft 166.

Figure 9:
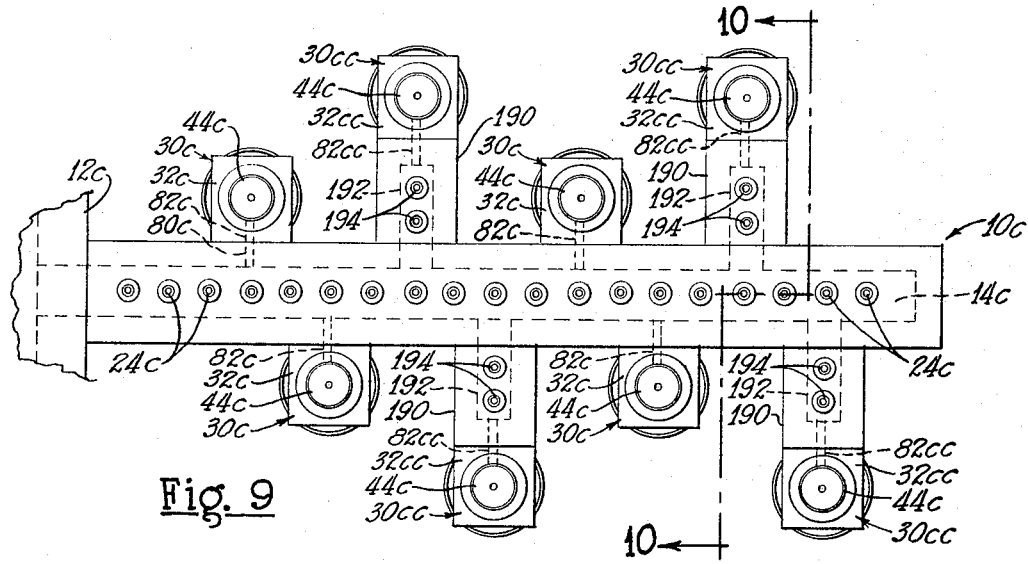
FIGURE 9 is a top plan view of an arrangement similar to FIGURE 2 illustrating a modified orientation of rotary fiber-forming units with respect to the forehearth.
Figure 10:
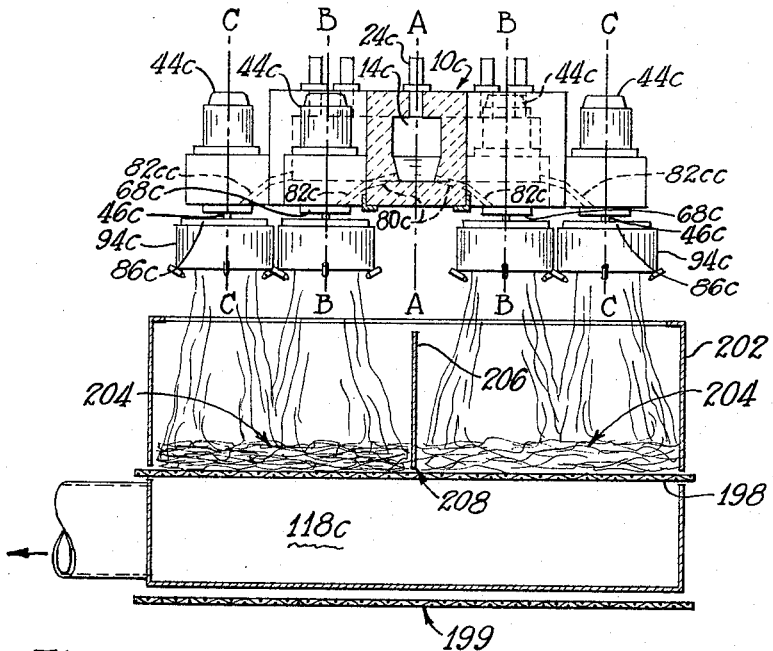
FIGURE 10 is a transverse sectional view taken substantially on the line 10—10 of FIGURE 9 and illustrating a fiber collecting means.

FIGURES 9 and 10 illustrates another form of orientation of fiber-forming units at each side and lengthwise of the forehearth in staggered relation in a manner to form a single fibrous mat of substantial width or to form two fibrous mats simultaneously in side-by-side relation. The elongated forehearth 10c is connected with a melting and refining furnace 12c. In the arrangement of FIGURES 9 and 10, there are two groups or series of fiber-forming units.

The units of one series are spaced in positions laterally of the forehearth at greater distances than units of a second group or series in order to deliver the attenuated fibers over a greater transverse dimension for forming a comparatively wide fibrous mat. The fiber-forming units 30c of the first group are positioned close to the lateral surfaces or faces of the forehearth 10c in the same manner that the units 30 are positioned in the form shown in FIGURE 3.

The fiber-forming units 30cc of the second group or series are arranged at each side of the forehearth and are spaced a greater distance from the forehearth than the fiber-forming units 30c. Disposed between each of the fiber-forming units 30cc of the second group and the exterior surfaces of the forehearth 10c is a spacer member or block 190 of refractory.

Each of the fiber-forming units 30c receives flowable glass from the forehearth channel 14c through connecting tubes 80c and 82c in the same manner as illustrated in FIGURE 3.

Each of the blocks 190 is provided with a glass conveying channel 192 connected with the forehearth channel 14c and in communication with a tube 82cc in the refractory block 32cc of each of the fiber-forming units 30cc. The roof of the forehearth is provided with a plurality of radiant burners 24c and the roof of each channel 192 in the blocks 32cc is equipped with radiant burners 194 to maintain the glass at a proper flowable condition throughout the length of the forehearth and in the transversely extending glass conveying channels 192.

Each of the fiber-forming units 30c and 30cc is equipped with a rotor mounted upon a shaft 46c surrounded by a blower 86c and a guard plate 94c of the same character as illustrated in FIGURE 3. Secured to the lower surface of each block 32c and 32cc is a stream feeder or bushing 68c, of the character shown in FIGURE 4, which delivers streams of glass into the rotor. In FIGURE 10 it will be noted that the axes BB of the fiber-forming units 30c at opposite sides of the forehearth 10c are spaced substantially equal distances from a central vertical plane AA through the channel 14c in the forehearth.

The axes CC of the fiber-forming units 30cc at opposite sides of the forehearth are equally spaced at each side of the plane AA but at greater distances from the forehearth channel. From FIGURE 10 it will be seen that there are four lengthwise rows of beams of fibers in the embodiment illustrated, with two beams of fibers in each row. Disposed beneath the forehearth 10c and fiber-forming units 30c and 30cc, the rotors of which are driven by motors 44c, is the upper flight 198 of a reticulated or foraminous conveyor 199 of the general type shown at 106 in FIGURE 2 but of substantially greater width.

The conveyor flight 198 is of a width to receive and accommodate the fibers from the four rows of beams of fibers whereby a fibrous mat is formed of collected fibers of a width substantially equal to the width of the conveyor flight 198. The conveyor flight 198 moves in a right-hand direction lengthwise of the forehearth and a suction chamber 118c is disposed beneath the fiber collecting region of the conveyor flight 198.

The arrangement shown in FIGURE 10 includes a fiber-forming hood 202 which embraces the plurality of beams of fibers to assist in directing the fibers onto the conveyor flight 198, the suction in the chamber beneath the flight 198 carrying away the spent gases of the attenuating blasts and blast-induced air and influencing the movement of the fibers toward the conveyor flight 198. Through this arrangement, a mat several feet in width may be formed from a single forehearth and the multiple fiber-forming unit arrangement.

The arrangement shown in FIGURE 10 may be advantageously utilized to produce simultaneously two fibrous mats 204 in side-by-side relation. In the production of two fibrous mats, a barrier, wall or partition 206 may be disposed in a vertical plane AA lengthwise of the forehearth 10c, the lower end 208 of the wall or partition 206 terminating adjacent the conveyor flight 198. The wall or partition means 206 effectively separates the fibers collected on one portion of the conveyor flight from those on another portion of the flight so that two fibrous mats 204 are formed concomitantly. The mats 204 may be of different densities or characteristics dependent upon the number of fiber-forming units at each side of the forehearth or the size of fibers produced by the groups of fiber-forming units. Thus, one wide fibrous mat or two mats or lesser width may be formed from a plurality of fiber-forming units supplied with glass from a single furnace and forehearth more economically and in much less space than has heretofore been required in forming fibrous mats.

Figure 11:
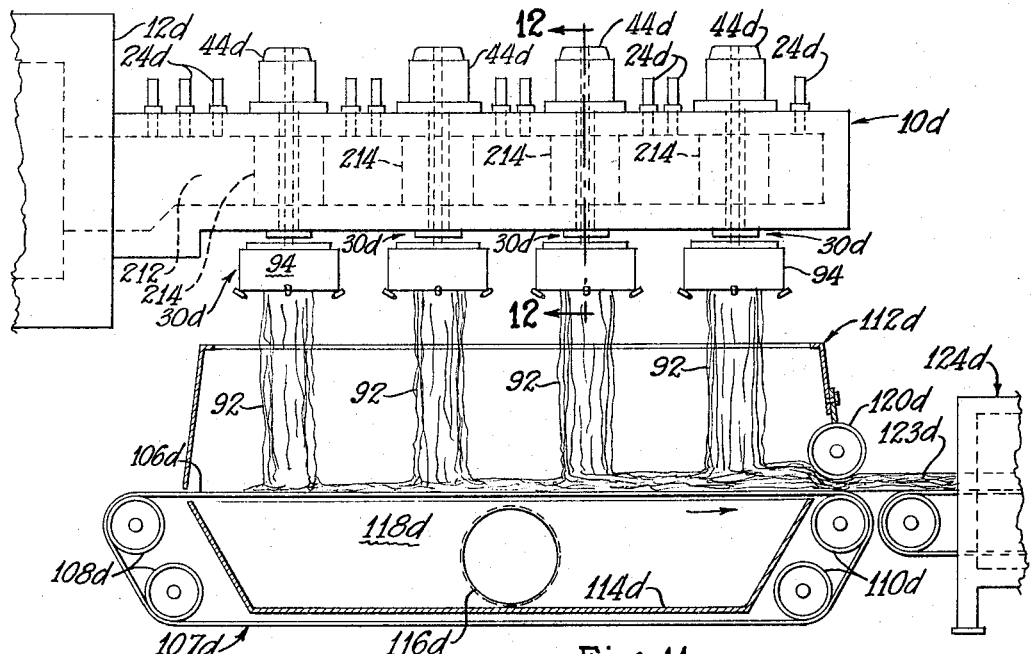
FIGURE 11 is a side elevational view similar to FIGURE 1 illustrating another method of orientation of fiber-forming units with a forehearth.
Figure 12:
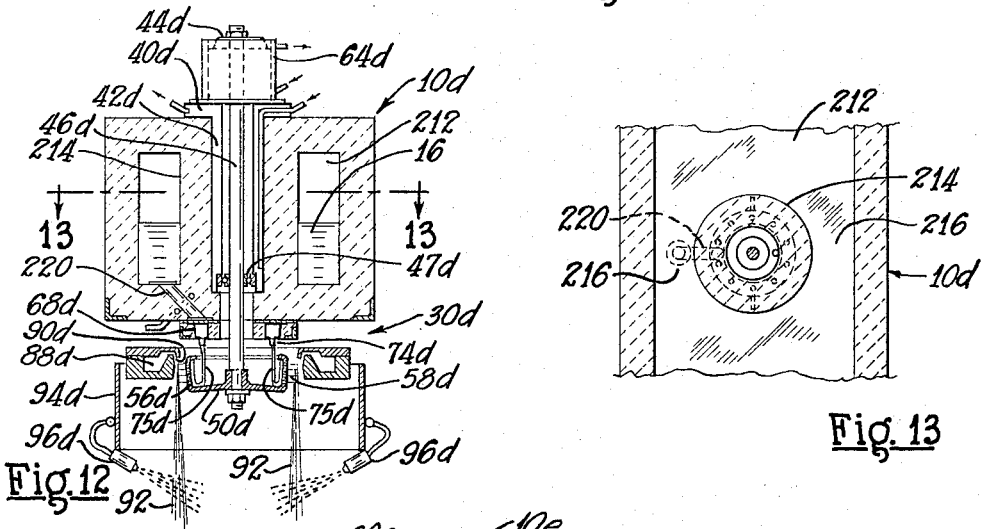
FIGURE 12 is a vertical sectional view taken substantially on the line 12—12 of FIGURE 11.
Figure 13:
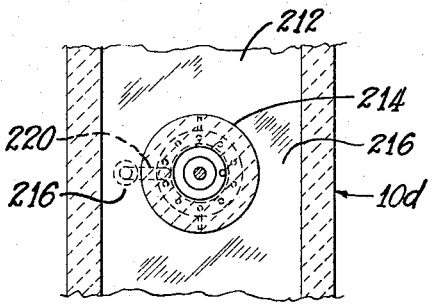
FIGURE 13 is a fragmentary detail sectional view taken substantially on the line 13—13 of FIGURE 12.

FIGURES 11 through 13 illustrate another arrangement of fiber-forming units associated with a forehearth wherein the rotors or spinners of the fiber-forming units are positioned close to the forehearth so as to minimize heat losses from the glass. The forehearth 10d is connected with a melting and refining furnace 12d, the forehearth being provided with a glass flow channel 212 disposed lengthwise of the forehearth.

In this form there is disposed centrally in the forehearth and in lengthwise spaced relation a plurality of cylindrically-shaped vertically arranged portions 214 of refractory.

The diameter of each of the cylindrical portions 214 is substantially less than the width of the flow channel 212 to provide passageways 216 between the inner walls of the forehearth channel 212 and the cylindrical portions 214, as shown in FIGURE 13. The axes of the fiber-forming units are arranged in a central vertical plane lengthwise of the forehearth channel.

The roof of the forehearth 10d is provided with radiant burners 24d to maintain the glass in the forehearth channel at a uniform temperature throughout the length of the channel. Each of the fiber-forming units 30d is substantially the same as the fiber-forming unit 30, shown in FIGURE 3, except that the motor shaft 46d is of greater length due to the increased vertical height of the forehearth. Each of the fiber-forming units 30d includes a fitting 40d formed with a cooling jacket construction 42d which is fitted into a vertical passage formed in the cylindrical portion 214.

The central region of the jacket is tubular to accommodate the motor shaft 46d driven by a motor 44d, the latter being disposed above and supported by the portion of the fitting 40d above the forehearth. The motor shaft 46d is journaled in anti-friction bearings 47d disposed adjacent the lower end of the cooling jacket. The rotor 50d is secured to the lower end of the motor shaft 46d.

Secured to the lower surface of the forehearth is a stream feeder or bushing 68d for each unit which receives molten glass 16 from the forehearth through a conveying channel or tube 220 similar to the tube 82 in FIGURE 3 and preferably formed of an alloy of platinum and rhodium.

The feeder 68d is of the same construction as the feeder shown in FIGURE 4, the orificed projections 74d flowing streams 75d of glass into the rotor. The peripheral wall of the rotor is provided with a large number of orifices 56d through which primary filaments 58d of glass are projected by centrifugal forces into a high velocity gaseous blast delivered through the annular orifice 90d from a manifold or chamber 88d for attenuating the primary filaments to fine fibers 92. A guard 94d surrounds the blower, and binder or other fiber coating material may be delivered onto the fibers by nozzles 96d.

The motor 44d is preferably surrounded with a cooling jacket 64d. It will be noted from FIGURE 3 that the glass conveying tube 220 for each fiber-forming unit is comparatively short and is surrounded by the refractory of the forehearth so that there is very little heat loss at this region, and the tube 220 may be electrically heated if desired. The feeder or bushing 68d is preferably electrically heated to maintain the glass in the feeder at the proper temperature and the rotor 50d is positioned close to the feeder 68d to reduce heat loss from the glass stream 58d.

It is to be understood that the burner arrangements, of the character shown in FIGURES 5 and 7, may be used with the rotor construction and fiber-forming unit shown in FIGURE 12, and the cooling means for a hollow rotor supporting shaft, shown in FIGURE 8, may be employed in lieu of the solid motor shaft 46d and the water cooling jacket 42d. In the arrangement illustrated in FIGURES 11 through 13, the fiber-forming units, being in a single line, produce beams of fibers which are likewise in aligned relation lengthwise of the forehearth.

A fiber collecting means of the character shown in FIGURE 1 is illustrated in FIGURE 11 and is inclusive of an endless belt conveyor 107d supported by pairs of rolls 108d and 110d, the upper flight 106d of the conveyor moving in a right-hand direction as viewed in FIGURE 11, one of the rolls supporting the conveyor being a driven roll. The conveyor is of the reticulated or foraminous type to facilitate passage of the spent gases of the blast and air into a suction chamber 118d provided by a receptacle 114d connected by a tube 116d with a conventional suction blower (not shown). Disposed above the conveyor flight 106d is a rectangular-shaped fiber-forming hood or enclosure 112d. The mass of collected fibers on the conveyor may be sized as to thickness by a sizing roll 120d to form a mat 123d which may be conveyed through an oven 124d to cure or set the binder in the mat.

Figure 14:
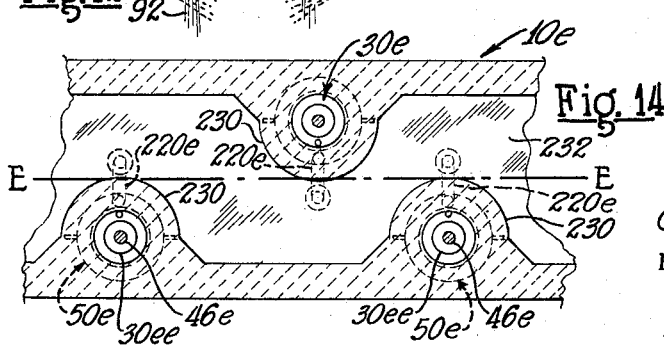
FIGURE 14 is a horizontal sectional view through a forehearth illustrating a modified orientation of a plurality of centrifugal fiber-forming units.

FIGURE 14 illustrates, in cross-section, a modified positioning or orientation of the fiber-forming units with a forehearth 10e whereby the alternate fiber-forming units are offset at opposite sides with respect to a central vertical plane through the forehearth channel. The side wall regions of the forehearth 10e are fashioned with inwardly extending semi-cylindrically-shaped portions 230 of refractory substantially integral with the refractory providing the forehearth.

In this form, one group or series of fiber-forming units 30e is arranged in a vertical plane at one side of the vertical plane EE through the central region of the forehearth channel 232, and the second series of fiber-forming units 30ee disposed in a vertical plane at the opposite side of the plane EE. The fiber-forming units employed in the arrangement shown in FIGURE 14 are the same as shown in FIGURE 12, the rotor 50e being supported upon a vertically disposed shaft 46e and driven by a motor disposed above the forehearth.

The formation of the portions 230 in alternate transverse arrangement provides a forehearth channel 232 of a zig-zag shape supplying each of the feed tubes 220 for the rotors with molten glass. The rotor of each of the fiber-forming units 30e and 30ee is positioned close to the stream feeder in the manner shown in FIGURE 12 to minimize heat losses.

Figure 15:
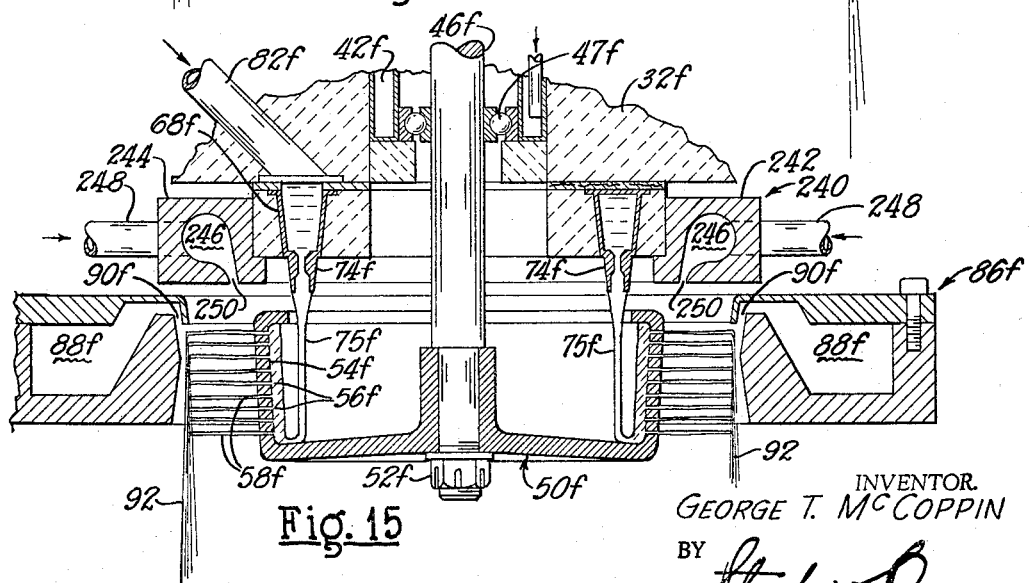
FIGURE 15 is a fragmentary detail sectional view similar to FIGURE 4 illustrating an arrangement for applying heat at the peripheral region of the rotor.

FIGURE 15 illustrates an arrangement similar to FIGURE 5 in combination with means for delivering heat into the region of the primary filaments exteriorly of the rotor. The arrangement shown in FIGURE 15 includes a block 32f of refractory having a central passage accommodating a cooling jacket 42f, the rotor supporting shaft 46f extending through the central region of the annular cooling jacket and being journaled in suitable anti-friction guide bearings 47f. A hollow rotor 50f is mounted on the lower end of the shaft 46f secured by a nut 52f.

A tube 82f conveys molten glass from a supply in the forehearth channel into a circular feeder or bushing 68f disposed beneath the refractory block 32f. The feeder 68f is of the character shown in FIGURE 4 having a plurality of orificed tips 74f through which streams of glass 75f flow into the hollow rotor 50f. The glass in the rotor is projected by centrifugal forces of rotation through orifices 56f in the rotor wall 54f to form primary filaments 58f which are projected into a high velocity blast of gases delivered through an annular orifice 90f from the manifold or chamber 88f of a blower construction 86f.

The arrangement shown in FIGURE 15 includes a burner construction 240 for supplying heat to the peripheral wall 54f of the rotor and the primaries 58f. The burner comprises two semi-annularly-shaped members 242 and 244 to accommodate terminals or terminal lugs on the bushing 68' of the character shown at 78 in FIGURE 4. Each semi-annular member 242 is fashioned with a semi-annularly-shaped chamber 246, each burner being provided with a mixture supply pipe 248.

The burners 242 and 244 may be of the type in which a combustible mixture is burned under confined conditions in the chambers 246 and the intensely hot products of combustion discharged through restricted annularly-shaped orifices 250 onto the primary filaments 58f and along the wall 54f of the rotor to maintain a high temperature at this region.

The burners 242 and 244 may be employed as flame burners wherein the mixture in the manifolds or chambers 246 is ignited after delivery of the mixture through the restricted orifices 250 whereby the mixture is burned exteriorly of the manifold chambers. The burner arrangement shown in FIGURE 15 may be utilized with the other forms of the fiber-attenuating units herein disclosed.

Figure 16:
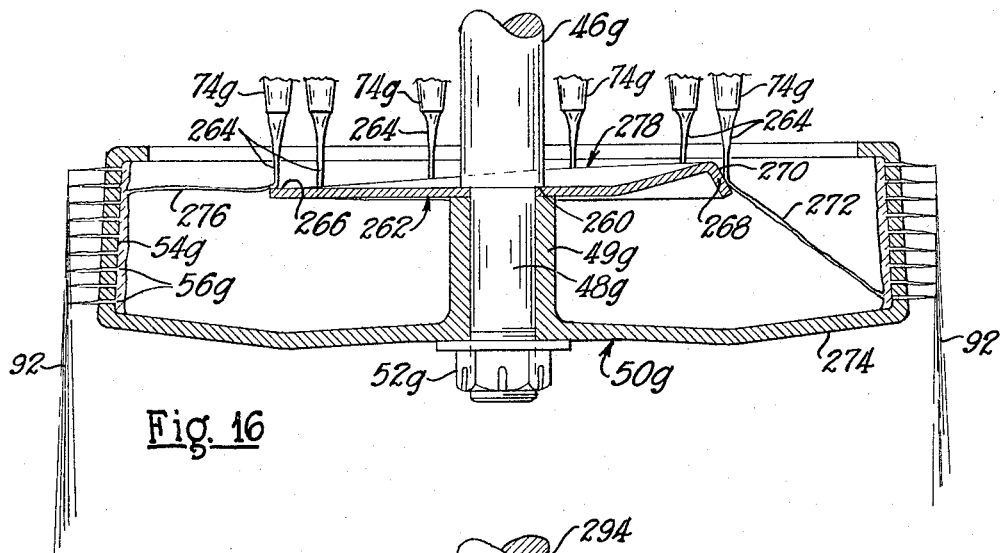
FIGURE 16 is an enlarged sectional view through a rotor illustrating a material distributing member associated with the rotor.

FIGURE 16 illustrates a rotor embodying a glass distributing means rotatable with the rotor, the distributing means being of a character to direct the glass of the streams through varying angular paths to distribute the glass substantially uniformly vertically at the peripheral wall of the rotor. The shaft 46g supports the rotor 50g, the rotor having a peripheral wall 54g provided with orifices 56g through which molten glass in the rotor is projected under centrifugal forces of rotation.

The hub 49g of the rotor is received on a tenon 48g formed on the shaft 46g. Disposed between the shoulder or ledge 260 of the shaft 46g formed by the tenon 48g is a distributor 262 in the form of a circular disk-like member secured on the tenon 48g between the hub 49g and the shoulder 260 by the nut 52g, the distributor member 262 being rotatable with the rotor.

The orificed projections 74g on the feeder or bushing are circumferentially spaced and arranged to deliver streams 264 of glass engaging the peripheral region of the distributor member 262.

The peripheral region of the circular distributor 262 is of varying angularity from a planar area 266 to an angularly arranged peripheral area 268 diametrically disposed with respect to the planar area 266. The angular portion 268 has its exterior surface region 270 of an angle such that a stream of glass 264 impinging upon the surface 270 is deflected by centrifugal forces of rotation of the distributor 262 and the angularity of the surface 270 to effect a deflection or diversion of the glass of the stream in a path designated 272 toward the interior lower portion of the peripheral wall 54g adjacent its juncture with a bottom wall 274 of the rotor.

The stream 264, diametrically opposite to the angular portion 268, impinges upon the planar portion 266 which is normal to the direction of the glass stream and, under the influence of centrifugal forces, the glass of the stream is projected substantially on the plane of the portion 266 in a path indicated at 276 toward the upper region of the rotor wall 54g. The peripheral region at each side of the planar region 266 progressively increases in angularity to the point of maximum angularity provided by the angular portion 268.

The gradation of the peripheral angular surface from the apex of the angular portion 268 to the flat or planar portion 266 is indicated by the line 278. Due to the varying angularity between the planar region 266 and the extreme angular surface 270 there is a continuous gradation of angularity affecting each of the glass streams to deflect or divert the glass streams in different paths between the horizontal path 276 and the extreme downwardly directed path 272 whereby the glass of the several streams is continuously diverted or directed toward the rotor wall at different levels.

Thus the distributor arrangement shown in FIGURE 16, employed with a stream feeder of the character shown in FIGURE 4, effects a substantially uniform distribution of the glass throughout the vertical height and circumferentially of the perforated rotor wall 54g. It is to be understood that the distributor 262 may be employed in any of the fiber-forming units herein disclosed except the form shown in FIGURE 5 wherein an internal combustion burner is used.

Figure 17:
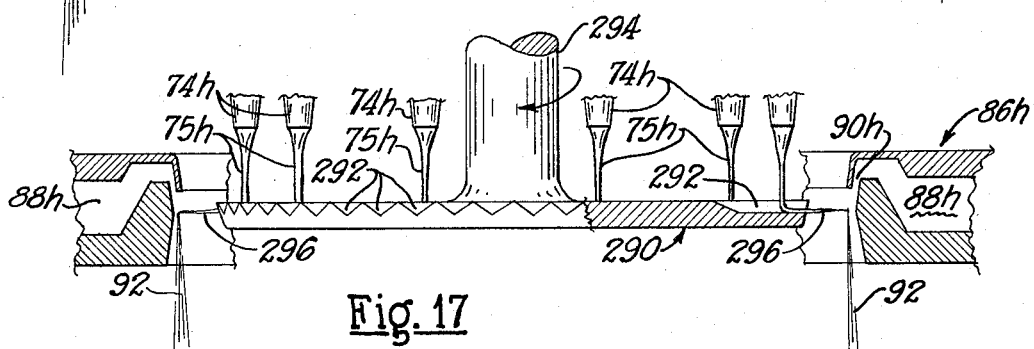
FIGURE 17 is an elevational view, partly in section, of a serrated disk-type rotor usable in the arrangement of the invention.

FIGURE 17 illustrates a modified form of rotor or distributor for directing glass of a plurality of streams into an attenuating blast. In this form, the rotor 290 is in the shape of a circular disk having a peripherally serrated region 292, the rotor being supported upon a shaft 294 driven by a motor, such as motor 44, shown in FIGURE 3. The rotor arrangement shown in FIGURE 17 may be used in any of the fiber-forming units shown in FIGURE 3 disclosed herein except a unit of the character shown in FIGURE 5.

The rotor 290 is surrounded by a blower 86h having a manifold or chamber 88h containing gas under pressure which is delivered as a high velocity blast through an annular restricted orifice 90h, the blast engaging the primary filaments 296 projected from the rapidly rotating rotor 290. The glass streams 75h are delivered through orificed projections 74h formed on an annular feeder or bushing of the character shown in FIGURE 4.

It should be noted that in this form, the rotor 290 may be disposed close to the projections 74h so that there is no appreciable heat loss from the streams during traverse of the glass from the projection 74h to the region of delivery of the primary filaments 296 into the attenuating blast from the orifice 90h. If an intensely hot attenuating blast is employed, a combustible mixture may be burned in the chamber 88h and the intensely hot products of combustion or burned gases delivered through the annular orifice 90*h* into engagement with the primary filaments 296 to attenuate the primary filaments to fine fibers 92. The serrated configuration 292 tends to subdivide each of the streams 75*h* into a plurality of primaries so that the primaries 296 are of much smaller diameters than the glass streams 75*h*. With this arrangement the number of primaries 296 projected from the periphery of the rotor 290 is many times the number of the glass streams 75*h* delivered into engagement with the peripheral region of the rotor. Means such as the burner construction 240, shown in FIGURE 15 may be employed to apply heat to the region of the streams 75*h* and the primary filaments 296.

It is apparent that, within the scope of the invention, modifications and different arrangements may be made other than as herein disclosed, and the present disclosure is illustrative merely, the invention comprehending all variations thereof.

I claim:

1. Apparatus of the character disclosed, in combination, a member of refractory having channel means formed therein adapted to contain heat-softened mineral material from a supply, a hollow rotor disposed directly beneath and close to the member, said channel means having an outlet adjacent the rotor to deliver the heat-softened mineral material into the rotor, the peripheral wall of the rotor having a plurality of orifices therein, a vertical passage in said member, a shaft in said passage supporting the rotor, an electrically energizable motor disposed above said member having operative connection with the shaft for rotating said shaft and rotor, said rotor being rotated at a speed whereby the material in the rotor is projected through the orifices by centrifugal forces as discrete bodies, heating means for applying heat adjacent the rotor, and manifold means concentric with the rotor having an annular orifice through which gases from the manifold means are delivered as an annular high-velocity gaseous blast into engagement with the bodies for attenuating the bodies to fibers.

2. Apparatus of the character disclosed, in combination, refractory means providing a channel adapted to contain heat-softened mineral material, material conveying passages in said means extending from both sides of said channel and in communication with the channel, a rotor disposed directly below and adjacent to the outlet region of each passage to receive heat-softened material from the channel, each rotor being disposed close to the outlet region of the adjacent passage to minimize heat loss from the material, motive means for rotating the rotors to project the material from the rotors by centrifugal forces to form discrete bodies of the material, means establishing an annular gaseous blast adjacent and surrounding each rotor and directing the blast into engagement with the bodies for attenuating the bodies to fine fibers, and a fiber collecting means arranged to receive the fibers from the attenuating blasts.

3. Apparatus of the character disclosed, in combination, a member of refractory having a channel arranged to contain heat-softened mineral material from a supply, a hollow rotor disposed directly beneath and close to the member, a feeder adjacent the member in communication with the channel to receive the mineral material from the channel, motive means disposed above the member connected with the rotor to rotate the rotor, said feeder having a plurality of orifices through which streams of the material from the feeder are delivered into the rotor, the rotor having a perforated peripheral wall whereby the material in the rotor is projected by centrifugal forces of rotation through the perforations as discrete bodies, and means surrounding and adjacent the rotor establishing an annular gaseous blast engageable with the bodies for attenuating the bodies to fine fibers.

4. Apparatus of the character disclosed, in combination, a member of refractory having a channel arranged to receive heat-softened mineral material from a supply, a hollow rotor disposed directly beneath and close to the member, an annularly-shaped feeder adjacent the member duct means in communication with said channel for conveying mineral material from the channel into the feeder, a vertical passage in said member, a shaft in said passage supporting the rotor, motive means disposed above the member adapted to rotate the rotor supporting means and rotor, said feeder having a plurality of orifices through which streams of the material from the feeder are delivered into the rotor, a peripheral wall of the rotor having a plurality of orifices through which the material in the rotor is projected from the orifices by centrifugal forces of rotation as discrete bodies, and means adjacent and surrounding the rotor establishing an annular gaseous blast engageable with the bodies for attenuating the bodies to fine fibers.

5. Fiber-forming apparatus, in combination, a forehearth provided with a channel adapted to contain a supply of heat-softened mineral material, a plurality of fiber-forming units spaced laterally from the forehearth at each side thereof, each of said fiber-forming units including a member of refractory, a rotor adjacent to and directly beneath each member, motive means disposed above each member for rotating the adjacent rotor, means in communication with the channel for conveying heat-softened mineral material from the forehearth to each rotor, said rotors being rotated at a speed whereby centrifugal forces of rotation project the material from the rotors in the form of primary filaments, means providing a walled chamber adjacent and surrounding each of the rotors, orifice means in the wall of the chamber through which an annular high-velocity gaseous blast is delivered into engagement with the bodies in directions normal thereto for attenuating the bodies to fine fibers, and conveyor means arranged to collect the fibers out of the blasts.

6. Apparatus of the character disclosed, in combination, a member of refractory having a channel therein disposed to receive heat-softened mineral material from a supply, a rotor disposed directly beneath and close to the member, a vertical passage in the member, means supporting the rotor extending through the passage, motive means disposed above the member connected with the rotor supporting means to rotate the rotor and rotor supporting means, feeder means in communication with the channel for delivering a plurality of streams of heat-softened material from the channel into the rotor, said rotor being rotated at a speed whereby centrifugal forces of rotation of the rotor effect the projection of the material from the rotor in the form of discrete bodies, and means for attenuating the projecting bodies to fibers.

References Cited by the Examiner

UNITED STATES PATENTS

| | | | |
|---|---|---|---|
| 2,192,944 | 3/1940 | Thomas | 18—2.5 |
| 2,609,566 | 9/1952 | Slayter et al. | 65—6 |
| 2,964,786 | 12/1960 | Levecque et al. | 65—15 |
| 3,014,235 | 12/1961 | Snow | 65—14 X |
| 3,082,614 | 3/1963 | Denniston | 65—11 X |

DONALL H. SYLVESTER, *Primary Examiner.*

C. E. VAN HORN, R. L. LINDSAY,
*Assistant Examiners.*